United States Patent [19]
Lange et al.

[11] 3,898,037
[45] Aug. 5, 1975

[54] ACRYLAMIDO-SULFONIC ACID POLYMERS AND THEIR USE

[75] Inventors: K. Robert Lange, Huntingdon Valley; Robert H. Schiesser, Warrington, both of Pa.; Richard G. Tonkyn, Frenchtown, N.J.; Russell T. Dean, deceased, late of Newtown Square, Pa.; by S. Martha Dean, executrix, Newtown Square, Pa.

[73] Assignee: Betz Laboratories, Inc., Trevose, Pa.

[22] Filed: Oct. 24, 1973

[21] Appl. No.: 409,125

Related U.S. Application Data

[62] Division of Ser. No. 258,778, June 1, 1972, Pat. No. 3,806,367.

[52] U.S. Cl............. 21/2.7 R; 134/3; 134/41; 210/58; 252/149; 252/389 R; 252/391; 252/395
[51] Int. Cl.$^2$.............. C23F 11/16; C23F 11/14
[58] Field of Search........ 252/389 R, 391, 395, 149, 252/151, 355; 134/3, 41; 21/2.7 R; 260/79.3 MU; 210/58

[56] References Cited
UNITED STATES PATENTS

| | | | |
|---|---|---|---|
| 2,692,673 | 9/1972 | Hoke | 260/79.3 MU |
| 2,983,712 | 5/1961 | Wilkinson | 260/79.3 MU |
| 3,284,187 | 11/1966 | Lindner | 252/355 |
| 3,332,904 | 7/1967 | La Combe et al. | 260/79.3 MU |
| 3,344,174 | 9/1967 | Broussalian | 252/355 |
| 3,506,707 | 4/1970 | Miller et al. | 260/79.3 MU |
| 3,544,597 | 12/1970 | Killam | 260/332.1 |
| 3,547,899 | 12/1970 | Arlt | 260/79.3 MU |
| 3,709,816 | 1/1973 | Walker et al. | 210/58 |
| 3,772,142 | 11/1973 | Doggett | 162/164 |

*Primary Examiner*—Benjamin R. Padgett
*Assistant Examiner*—Irwin Gluck
*Attorney, Agent, or Firm*—Alexander D. Ricci

[57] ABSTRACT

The present disclosure is directed to polymers and copolymers of acrylamido-sulfonic acid compounds and their use basically as dispersants for particles contained in aqueous systems. Exemplary of the sulfonic acid compound is 2-acrylamido-2-methylpropane sulfonic acid, or water-soluble salt thereof; and representative of the co-monomers which the acid is copolymerized with can be mentioned, acrylic acid and derivatives thereof, acrylamide and derivatives thereof, vinyl pyrrolidone, etc. The polymers and copolymers are specifically useful in dispersing water-insoluble compounds of iron, calcium, magnesium and aluminum and such commonly occurring particles of slit and clay.

3 Claims, No Drawings

ACRYLAMIDO-SULFONIC ACID POLYMERS AND THEIR USE

This is a division of application Ser. No. 258,778, filed June 1, 1972, now U.S. Pat. No. 3,806,367.

BACKGROUND OF THE INVENTION

Most waters contain ingredients, either naturally occurring, or as contaminants or formed by the reaction or association of anions and cations and mixtures thereof which can cause accumulation, deposition and fouling problems. Environments where these problems are often encountered ranged from the silt and mud collections which accumulate in the bottoms of water storage tanks and ballast tanks of vessels and ships, to the fouling problems which occur in cooling systems, utilizing once-through or recirculating systems or the deposition problems which can and would occur in both cooling and boiler water systems if the water were not treated beforehand. The accumulation of particles in, for example, ballast tanks obviously has a decided effect upon the economy of the maintenance and operation of the vessel. In both cooling and boiler water systems, economy is affected by both the impedance of flow of the water therein and the reduction in heat transfer efficiency which concurrently occurs. In boiler water systems the buildup of deposits or accumulation because of the serious reduction in heat transfer capacity can directly result in burnouts which require a replacement of tubes. In addition, problems such as localized pitting and general corrosion are observed on the base metal below such deposits.

General Deposit Control Mechanisms

Common deposits include iron oxides, calcium and magnesium deposits (carbonate, sulfate, oxalate and phosphate), silt, alumina, aluminum silicates, clays, etc.

If all matter could be kept dissolved, or at least maintained in suspension if already in the solid phase, there would never be any deposition problems to contend with in the first instance.

The phenomenon of suspension involves settling of particles in a liquid medium. The parameters which control settling rates are particle size, relative liquid and particle densities and liquid or effective liquid/solid viscosity. Settling rates are directly proportional to particle size and inversely proportional to liquid viscosity. These relationships are apparent from Stoke's Law. Obviously then, control of particle size is one aspect of deposit control. However, once particles have settled, the nature of the resultant sludge is dependent on the attractive forces between particles and the surfaces which they contact. If the attractive forces between particles are strong, the deposit formed is dense and well structured. If they are weak, deposition is less likely to occur, particularly at flow conditions. Similarly, if the attractive forces between particles and the surfaces which they contact are high, the deposit becomes adherent and is difficult to move. Thus, control of attractive forces is the major factor in two mechanisms involved in deposit control: (1) control of particle agglomeration and deposit nature by altering attraction between particles; and (2) the control of the adherent nature of particles by altering the attractive forces between surfaces and particles.

Of course, scale type deposition does not occur if precipitation is prevented in the first place. Similarly, the rate of deposition and the nature of crystal formation can be affected by controlling the rate of inorganic type precipitation. This rate control mechanism is another important aspect of deposit control technology.

Thus, the basic mechanisms of deposit control are fourfold:

1. Controlling particle agglomeration and deposit nature through affecting particle-particle attractive forces.
2. Providing surface protection through affecting particle-surface attractive forces.
3. Controlling the rate of precipitation and crystal growth rate.
4. Increasing the particle-water attraction by providing adsorbent species on the particle surface that have a high attraction for water as well as for the particle surface.

Deposit control formulations utilize one or more of these mechanisms. And significantly, all three mechanisms can be achieved by using materials which function nonstoichiometrically, as opposed to materials, such as chelants, which function on a strict stoichiometric basis. This permits achievement of economic treatment levels for a wide variety of fouling substances.

The following guidelines relate to the type of dispersant required for deposition problems normally encountered in cooling water systems where inorganic particles can be derived from make-up water, airborne particles, interaction of chemicals and corrosion products.

a. Unclarified river water contains silt and clays which must be dispersed in order to prevent serious deposition problems. Certain lignosulfate dispersants have been partially effective in some instances. However, polyelectrolytes (polyacrylic) have demonstrated a somewhat wider success in handling a greater variety of suspended matter from surface supplies.

b. Iron fouling from the make-up or from corrosion in the system requires a specific dispersant, such as certain selected lignosulfonates or the organic phosphonate based agents. The important element here is control of particle agglomerations through affecting particle/particle attractive forces. A more sophisticated dispersant system has been required when gross iron fouling of copper alloy equipment is experienced.

c. Calcium carbonate, calcium sulfate, calcium oxalate, calcium phosphate and similar magnesium salts are the most common types of hardness scale. Dispersion of these salts has been affected with the use of specially formulated organic phosphonate based dispersants. Polyacrylics have aided in the dispersion of calcium in certain cases.

d. Oil fouling, which is extremely common in the petrochemical industry, is solved by the formation of an oil-in-water emulsion. The dispersant adsorbs on the oil particles and gives them hydrophilic characteristics. This action enables the oil to disperse in the water for subsequent removal in the blowdown of the cooling tower, thus preventing the accumulation of undesirable oil deposits.

e. Bacterial slime is perhaps one of the most common components of cooling system deposits. The metabolic products of the microorganisms add to the bulk of the deposition and can, along with the organisms themselves, entrap debris to cause additional accumulation.

Most practical problems as they occur for example in cooling water systems are usually the result of the presence of two or more deposits. Accordingly, deposit control treatments have been proposed on a more or less prescriptive nature and therefore are no longer composed of a single material but most often a complex mixture of catalyzers and modifiers so that economical and effective treatments can be utilized.

As set forth above, each of the type particles set forth possesses a dispersant which can be utilized to inhibit its deposition. However, each also possesses its particular disadvantage. For example, the lignosulfonates have found limited use because of the destructive effect which oxygen has on the molecule. For the most part, industrial cooling water systems make use of air-water contact and the resulting evaporation for the cooling effect. Accordingly, the lignosulfonate molecule degenerates and feeding at a high rate is necessary. This in fact affects the overall cost-effectiveness of the treatment.

Although effective for the most part, the polyacrylates and polyacrylamides (partially hydrolyzed) have quite low calcium tolerances, i.e., will react with calcium cation resulting in a precipitate causing a deposition problem of its own. In many instances the water to be treated is high in hardness, or because of cycles of concentration within a cooling water system average hardness water becomes high hardness, thereby becoming a potential problem. When this is the case, polyacrylates and hydrolyzed polyacrylamides cannot be safely used. The foregoing is equally true with respect to the phosphonate and most of the lignosulfonate based dispersants currently used by the industry.

In addition and of extreme importance is the dispersant's capacity to deflocculate and disperse flocculated or agglomerated solids. Except for the phosphonate dispersants, the remaining dispersants do not have the capacity to deflocculate solids. The capacity of the phosphonates to accomplish this end at best is only minimal; however, to require a material to function in both capacities is considered to be rather demanding.

The capacity of a material to deflocculate and disperse also plays an important role in the cleaning of silt, debris and clay from tanks. With the proper agitation conditions and proper treatment, deposited and accumulated particles can be suspended, dispersed and removed. Accordingly, in developing new dispersants, the compound, polymer or product should desirably possess i. excellent dispersant properties for particles having a wide range of zeta potentials, either positive or negative, ii. a high calcium tolerance (high hardness tolerance) and resisting precipitation of the calcium salt of the polymer, iii. the capacity to function as dispersants in high hardness environments, and iv. the capacity to deflocculate flocculated or agglomerated particles and to disperse such once deflocculated.

The foregoing properties are equally desirable with respect to dispersants for boiler water treatment. Although boiler feed water normally undergoes softening treatment to remove hardness, there is always some leakage of hardness into the steam system. Therefore, because of cycles of concentration, the water in the return together with the hardness leakage in the makeup, hardness may increase considerably, giving rise to a deposition potential. To protect against deposition then, a dispersant must be utilized. However, this dispersant must not only be capable of suspending the solids, but must also obviously possess a relatively high tolerance to calcium to insure against precipitation of the dispersant itself. Very few of the dispersants currently used possess this capability. Dispersants are also of importance in boiler operations since these materials must act not only as dispersants, but also as conditioners to maintain the sludge in the mud drum somewhat fluid; this subsequently permits the easy removal of the sludge by blowdown.

As set forth above, the desirability of a dispersant's high tolerance to hardness to the extent that it will not react with the hardness importing cations, namely, calcium and magnesium, is an important criterion. However, also of importance is whether the particular dispersant continues to function as such in high hardness environments. In some instances particular dispersants may not chemically react with the hardness ions but will in fact be effected by such as to fail either to function in this capacity or to function as effectively as the dispersant is capable of functioning in lower hardness environments.

In view of the foregoing demands made upon a material which is to function as a dispersant, it is obvious that the industry is constantly attempting to build molecules which would function effectively in the diverse ranges normally encountered. Faced with these odds, the present inventors were not only successful in producing new polymeric materials, but also polymeric materials which possessed as a group all of the desired properties as set forth earlier and which for the most part were free of the attendant disadvantages possessed by the dispersants currently used in the art. These materials may be basically described as polymers and copolymers of acrylamido sulfonic acid derivatives (vinylic sulfonic acid compounds).

GENERAL DESCRIPTION OF THE INVENTION

The Polymeric Materials

The polymeric materials of the invention are those produced from a monomer possessing the general formula

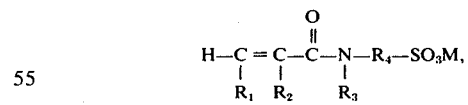

wherein $R_1$, $R_2$ and $R_3$ represent hydrogen, lower alkyl, i.e., alkyl of 1 to 6 carbon atoms such as methyl, propyl and hexyl, and $R_4$ is a lower alkylene having from 1 to 8 carbon atoms, i.e., methylene, propylene, hexylene and octylene and branched lower alkylenes, i.e., isopropylene, isobutylene, etc.; lower alkyl, i.e., $C_1 - C_4$ substituted lower alkylene group; a mononuclear aromatic hydrocarbon (e.g., benzene) or lower alkyl substituted mononuclear aromatic hydrocarbon. M represents hydrogen or any metal cation which does not adversely affect the water solubility of the polymer such as the alkali metal cations, namely sodium and potassium and the ammonium cations. In addition, M may also represent calcium, magnesium and lithium since they present no adverse effects on the solubility of the polymer.

The polymeric materials of the invention encompass homopolymers and copolymers including terpolymers. The molecular weight ranges for the polymers of the invention can range rather extensively, for example, from about 750 to 5,000,000 or more. For the application of the polymers as set forth herein, the preferable range encompasses from about 750 to about 250,000 with the most desirable range being from about 1,000 to about 100,000.

When the polymer of the invention is a copolymer of either two or three monomers including the monomer exemplified by the above structural formula, the comonomer may be for all practical purposes any vinyl monomer, providing the water solubility of the polymer is not altered to a great extent. The monomer is preferably selected from the group consisting of acrylic acid and the lower alkyl substituted acrylic acid (e. g. methacrylic acid), the alkali metal and ammonium salt thereof, the esters thereof; acrylamide and the lower alkyl substituted acrylamides (e.g., methacrylamide); the N-alkyl substituted and the N-alkanol substituted compounds thereof; vinyl compounds, e.g., vinyl pyrrolidone, acetate, formate, chloride, alcohol, etc.; unsaturated vinylic acids, e.g., maleic acid or anhydride, itaconic acid, etc. and the alkali metal and ammonium salts thereof; esters of vinylic acids, e.g. mono and dimethyl maleate, mono and di-ethyl itaconate, etc. Although the copolymers have been described as basically composed of two or three monomers, the polymer may of course be composed of any number of monomers. The repeating units of the homopolymer may basically be represented as follows:

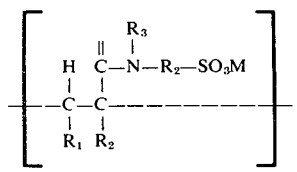

The repeating unit for copolymers composed of the acrylamido-sulfonic acid monomer and another monomer may be basically as follows:

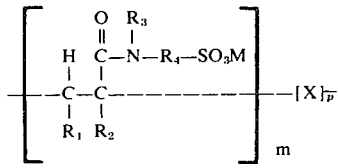

where X represents the units obtained from the copolymerized monomer.

With terpolymers it would be expected that the repeating units would comprise a polymer having an

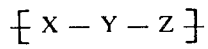

configuration, where X, Y and Z represent the different chemical structures for the respective monomers. However, as is well-known, it is difficult, if not impossible, to control a polymerization to the degree necessary to insure the configuration noted above.

The copolymers of the invention may comprise from about 3 to about 97% by weight and preferably from about 20 to 80% and most desirably from about 30 to about 70% by weight of the acrylamido-sulfonic acid monomer and conversely from about 97 to about 3% and preferably from about 80 to about 20% and most desirably from about 70 to about 30% by weight of the other vinylic monomer. In cases of terpolymers, the percentage by weight for the "other vinylic monomer" may represent in essence the total percentage by weight of a mixture of the monomers. The mixture of monomers may range from about 3 to 97% by weight of the initial monomer, i.e., the acrylamido-sulfonic acid and from about 97 to 3% by weight of the remaining monomer or monomers. Preferably the ratio is 20 to 80% by weight of initial monomer and most desirably above 50% and 80 to 20% of the "other vinylic monomer."

The acrylamido vinyl sulfonic acid monomers which are responsible for the unexpected properties of the novel polymers are prepared by well-known processes which are illustrated by U.S. Pat. No. 3,506,707 and the patents referred to and cited therein.

Although various derivatives which are included within the structural formula set forth earlier may be prepared, the monomer which has been found to be particularly suitable in accordance with the present invention is 2-acrylamido-2-methylpropane sulfonic acid, or salt thereof, which possesses a structural formula of

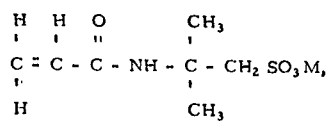

where M represents primarily hydrogen, sodium, potassium, ammonium. However, M may also represent lithium, calcium or magnesium.

Preparation of the Instant Polymers

The polymers and copolymers of the instant invention are prepared in an aqueous medium utilizing free-radical polymerization initiators. The basic method entails making an aqueous solution of the monomer or monomers, adding to said solution an effective amount of the initiator and maintaining the resulting solution at a temperature of from about 70° to 100°C. The polymerization time may range from as little as ½ hour to 12 hours and as with the amount of initiator used, will vary according to the monomers, their concentrations and the initiator used. However, for the most part, a temperature range of from about 75° to 95°C is most adequate and a reaction time of 3 to 7 hours has proved to be quite successful. The initiators used to produce the polymers of the present application may be exemplified by the redox systems, for example, a persulfate system utilizing potassium persulfate and sodium sulfite or NaH[Fe"(EDTA)] or hydrogen peroxide, for example, a system utilizing either hydrogen peroxide alone or in combination with NaH[Fe"(EDTA)]. In addition, initiators such as azobisisobutyronitrile, Vazo 64, i.e., 2,2'-azo-bis [2-methylpropionitrile] or FAS-APS, i.e. ferrous ammonium sulfate and ammonium persulfate may be utilized.

When utilizing a redox system which is based upon persulfate, there will advantageously be an amount of persulfate not in excess of 10,000 parts per million and preferably below 5,000 parts per million based upon the total weight of the aqueous system containing the monomeric material to be polymerized. When the azo compounds are utilized as the free-radical source, there should be used an amount of the azo compound at the range of from about 100 to 5,000 ppm based upon the total weight of the aqueous system.

The polymerization of the monomer(s) can be effected under conditions conventionally used in the art, for example, purging the polymerization apparatus with $N_2$ or $CO_2$ or other such gases prior to addition of the polymerization initiator.

As chain transfer agents, ferric and cupric salts such as ferric nitrate, acetate, cupric nitrate, cupric acetate, etc. may be used. Also, any metal salt providing hypophosphite ion such as sodium hypophosphate may be utilized. Compounds such as the lower primary and secondary alcohols, e.g., isopropanol and the basic mercaptans R-SH, e.g. dodecylmercaptan, may also be used for this purpose. These compounds basically function to control the molecular weight of the polymer.

Utilizing the above-described procedure, 10 to 30% solutions of polymer were made possessing Brookfield viscosities falling in the range of 5 to 1,700 centipoises with the bulk of the viscosities falling in the range of 5 to 50 centipoises. As earlier stated, the molecular weight ranges of the polymers were from about 1,000 to 250,000 with the bulk falling in the range of 10,000 to 100,000. These ranges were confirmed utilizing Gel Permeation Chromatography techniques.

Preparation of Polymers

In providing an encompassing study of the polymeric materials of the invention and the use thereof, the monomeric 2-acrylamido-2-methylpropane sulfonic acid, hereafter referred to as AMPS was chosen as exemplary of the vinyl sulfonic acids represented by the structural formula and was subjected to comprehensive review. Accordingly, the polymers described hereafter were all produced utilizing this monomer.

EXAMPLE 1

Homopolymer of AMPS

An aqueous solution of 11 grams of sodium hydroxide in 300 grams of water was prepared and 70 grams of AMPS were added thereto and stirred until dissolved. Isopropanol (200 ml) was added to the aqueous AMPS solution. The solution was then purged with nitrogen for 30 minutes, heated to reflux (80° C) and 2 ml of 30% hydrogen peroxide were added thereto. After two hours at reflux, an additional 2 ml of 30% hydrogen peroxide were added and the resulting solution heated at reflux an additional 3 hours. The solution was stirred during the reflux period and a gentle nitrogen purge was maintained throughout the run. After the solution cooled to room temperature, a Brookfield viscosity was taken which measured 4.9 cps. The percentage dissolved solids was measured as 11.5 with a residual unreacted monomer of approximately 2%.

EXAMPLE 2

Copolymer of 70% AMPS (sodium salt) and 30% Acrylamide

A solution of 9 grams of sodium hydroxide in 350 grams of water was prepared, 46.5 grams of 2-acrylamido-2-methylpropane sulfonic acid added, stirred until dissolved, and 21.4 grams of acrylamide added. Isopropanol (150 ml) was added, the solution purged with nitrogen for 30 minutes, heated to reflux (80° C) and 2 ml of 30% hydrogen peroxide were added. After 2 hours at reflux, an additional 2 ml of 30% hydrogen were added and the solution heated at reflux an additional 2.5 hours. The solution was stirred throughout the run and a gentle nitrogen purge was maintained throughout the experiment. After the polymer solution cooled to room temperature, it had a Brookfield viscosity of 18.5 cps at 14.7% solids.

EXAMPLE 3

Copolymer of 62% AMPS and 38% disodium maleate (weight %)

A solution containing 12.9 grams of sodium hydroxide in 140 ml of water was prepared and 10.6 grams of maleic anhydride added and stirred until dissolved. 22.2 grams of 2-acrylamido-2-methylpropane sulfonic acid and 60 ml of isopropanol were added, the solution purged with nitrogen for 0.5 hour, heated to reflux (80° C) and 2 ml of hydrogen peroxide (30%) added. After 2 hours an additional 2 ml of hydrogen peroxide (30%) were added and heating continued for 3 hours. After cooling to room temperature, the solution had a Brookfield viscosity of 5.2 cps.

EXAMPLES 4 THROUGH 11

Copolymers of AMPS (sodium salt)

In a manner similar to those as set forth in Examples 1 through 3, copolymers of AMPS (sodium salt) respectively with acrylamide (Example 4); methacrylamide (Example 5); N-methylol acrylamide (Example 6); sodium acrylate (Example 7); and sodium methacrylate (Example 8); disodium maleate (Example 9); disodium itaconate (Example 10) and vinyl pyrrolidone (Example 11) were produced. The specifics for the respective compositions of the copolymers, the reaction conditions and the initiator used are set forth in the following Table.

As in the preceding Examples, the reaction medium utilized was a solution of isopropanol and water with the alcohol being utilized at a ratio of 1 part per 3 parts of water. This ratio provides a medium which not only refluxes in the desired temperature range, but the isopropanol of the solution also functions as a chain transfer agent to control the molecular weight of the polymer.

In certain instances a number of different copolymers were produced utilizing the AMPS in combination with the same monomer. In these instances some variable has been altered, e.g. concentrations of the respective monomers, reaction conditions, initiator content and type, etc. Where this is the case, the polymers are designated alphabetically in the Table together with the Example number for the parent polymer described in the appropriate Example; the variations are also recorded in the Table for the respective copolymer.

TABLE 1

| Sample | Copolymer of | Composition Ratio-% by weight | Initiator | Reaction Temp. °C | Reaction Time- Hrs. | Viscosity (Brookfield) Centipoises | % Solids in Final Solution | Residual Monomer Approx. |
|---|---|---|---|---|---|---|---|---|
| 4A | AMPS(sodium salt)/Acrylamide | 70:30 | Hydrogen peroxide | 82 | 5.0 | 32 | 14.7 | 1.3 |
| 4B | " | 70:30 | " | 80 | 11.5 | 18.5 | 14.1 | 1.7 |
| 4C | " | 50:50 | " | 80 | 5.5 | 32.7 | 15.0 | .8 |
| 4D | " | 30:70 | " | 80 | 5.5 | 39.5 | 14.8 | 4.3 |
| 4E | " | 70:30 | Hydrogen peroxide/VAZO | 80 | 5.5 | 21.2 | 13.9 | 2.5 |
| 4F | " | 30:70 | " | 80 | 5.5 | 36.7 | 14.7 | 2.2 |
| 4G | " | 70:30 | VAZO | 80 | 5.0 | 24.5 | 14.0 | 0 |
| 4H | " | 30:70 | VAZO | 80 | 3.0 | 45.7 | 15.0 | 0 |
| 4J | " | 70:30 | VAZO | 85 | 4.0 | 100.0 | 13.8 | — |
| 4K | " | 70:30 | VAZO | 89 | 4.0 | 912.0 | 14.0 | <.5 |
| 4L | " | 70:30 | VAZO | 89 | 5.0 | 4600.0 | 13.8 | <.5 |
| 5A | AMPS(sodium salt)/Methacrylamide | 70:30 | Hydrogen peroxide | 83 | 5.0 | 16.0 | 14.0 | — |
| 5B | " | 70:30 | " | 88→92 | 5.0 | 19.0 | 17.2 | — |
| 5C | " | 50:50 | " | 80 | 5.0 | 19.3 | 18.0 | — |
| 5D | " | 30:70 | " | 80 | 5.0 | 29.8 | 17.9 | — |
| 5E | " | 70:30 | VAZO | 80 | 5.0 | 30.5 | 14.2 | 0.1 |
| 6A | AMPS(sodium salt)/N-methylol acrylamide | 70:30 | Hydrogen peroxide | 80 | 5.0 | 14.8 | 13.3 | — |
| 7A | AMPS(sodium salt)/sodium acrylate | 70:30 | VAZO | 92 | 5.0 | 10.5 | 13.3 | 1.0 |
| 7B | " | 70:30 | VAZO | 80 | 4.0 | 17.2 | 13.6 | — |
| 7C | " | 70:30 | VAZO(No IPA used) | 80 | 4.0 | 25.5 | 13.6 | |
| 7D | " | 70:30 | VAZO(No IPA used) | 90 | 4.0 | 25.0 | 13.8 | |
| 7E | " | 70:30 | 36.5 ppm VAZO used (No IPA used) | 85 | 4.0 | 18.8 | 13.4 | <1 |
| 7F | AMPS(sodium salt)/sodium acrylate | 70:30 | 365.0 ppm VAZO used No IPA used | 87 | 4.0 | 28.2 | 13.4 | <1.5 |
| 7G | " | 70:30 | 182.5 ppm VAZO used No IPA used | 87 | 4.0 | 28.0 | 13.1 | — |
| 7H | " | 50:50 | VAZO | 82 | 4.0 | 15.2 | 12.5 | <1 |
| 7J | " | 30:70 | VAZO | 83 | 4.0 | 9.2 | 8.7 | <1 |
| 7K | " | 50:50 | Hydrogen peroxide | 77 | 5.0 | 16.0 | 12.0 | — |
| 8A | AMPS(sodium salt)/sodium methacrylate | 50:50 | Hydrogen peroxide | 80 | 4.0 | 9.2 | 22.3 | 4.0 |
| 9A | AMPS(sodium salt)/disodium maleate | 55.1:44.9 (1:1 mole) | VAZO | 80 | 5.0 | 8.8 | 21.5 | 2.6 |
| 9B | " | " | VAZO | 85 | 4.0 | 6.5 | 18.6 | — |
| 9C | " | " | VAZO | 89 | 4.0 | 12.8 | 20.1 | — |
| 9D | " | " | VAZO | 98 | 4.0 | 7.8 | 16.8 | — |
| 9E | " | " | VAZO | 78 | 4.0 | 9.2 | 19.4 | <1 |
| 9F | " | " | Hydrogen peroxide | 80 | 10.5 | 5.1 | — | 2.2 |
| 9G | " | 38.1:61.9 (1:2 moles) | " | 80 | 5.0 | 2.6 | 16.7 | — |
| 10A | AMPS(sodium salt)/disodium itaconate | 50:50 | VAZO | 78 | 4.0 | 4.5 | 13.7 | — |
| 10B | " | 70:30 | VAZO | 80 | 4.0 | 4.0 | 14.0 | — |
| 10C | " | 30:70 | VAZO | 80 | 4.0 | 4.5 | 13.7 | — |
| 11A | AMPS(sodium salt)/vinyl pyrrolidone | 70:30 | Hydrogen peroxide | 81 | 3.0 | 4.4 | 13.5 | |

EXAMPLES 12 THROUGH 14

Terpolymers containing AMPS

Terpolymers containing AMPS as one of the monomers were produced in accordance with the procedure outlined in Example 1. As with the preceding Examples, certain of the variables were changed and these are noted under the appropriate heading in Table 2.

TABLE 2

| Sample | Copolymer of | Composition Ratio-% by weight | Initiator | Reaction Temp. °C | Reaction Time- Hrs. | Viscosity (Brookfield) Centipoises | % Solids in Final Solution | Residual Monomer Approx. |
|---|---|---|---|---|---|---|---|---|
| 12A | Sodium AMPS/Sodium Acrylate/ Acrylamide | 61/13/26 | Hydrogen peroxide | 82 | 5.0 | 31.3 | 15.0 | — |
| 12B | " | 70/9/21 | " | 82 | 5.0 | 19.0 | 15.4 | |
| 13A | AMPS/Acrylic/maleic anhydride | 39.5/16.2/44.3 (.5/.5/1.0 mole) | Hydrogen peroxide | 85 | 5.0 | 7.2 | 14.6 | 29.5 |
| 13B | " | " | VAZO | 84 85 | 12.0 | 7.2 | 14.8 | 10.0 |
| 13C | " | " | VAZO | 80 | 5.0 | 6.5 | 13.8 | 22 |
| 14A | AMPS/N-methylol-Acrylamide/ maleic anhydride | 37.2/21.3/41.5 (.5/.5/1.0 mole) | Hydrogen peroxide | 83 | 5.0 | 6.5 | 10.9 | 22.0 |
| 14B | " | " | VAZO | 80 95 | 12.0 | 6.5 | 24.9 | 8.0 |

Utility

In order to study dispersion, the polymers produced were tested on a variety of inorganic solids and, in particular, iron oxide. This material is difficult to disperse and many polymers presently available will flocculate iron oxide rather than disperse it, especially under conditions of high $Ca^{++}$ hardness. Further, iron oxide normally agglomerated in the absence of a dispersant. Therefore, good dispersion may require firstly, the disintegration of agglomerates; secondly, the dispersion of the particles; and thirdly, their stabilization in suspension. It is generally felt that if a polymer is successful in dispersing iron oxide ($Fe_2O_3$), a stringent test, it will satisfactorily disperse other particles which are somewhat difficult to disperse.

The data presented was obtained by measuring the optical transmissions of suspensions under standard treatment conditions. Transmission will decrease with improved suspension of agglomerates and/or the disintegration of agglomerate structures. In particular, the latter circumstance will lead to lower values of transmission. Better stabilization of suspended particles may take place by the creation of electrical charges that provide for mutual repulsion between particles and/or the development of hydration layers that protect the particles from interparticular agglomeration. The AMPS derivatives appear to operate primarily by the build-up of hydration layers about the disintegrated residues of agglomerated particles, although the electrical charge effects may also be operating.

In examining the following data, each series must be referred to its own blank (suspension with no treatment). These blanks were run each time a fresh experiment was performed so as to eliminate artifacts resulting from variations in mixing conditions, sampling of the solid, etc.

Terpolymers

In order to establish the effectiveness of terpolymers containing AMPS as a dispersant for iron oxide ($Fe_2O_3$), the terpolymer of Example 12A was subjected to the test as described above. The conditions were the same as those recorded for Table 3, the results of the test are recorded in Table 4B below.

TABLE 4B

| Polymer Dosage | AMPS/AA/AM |
| --- | --- |
| 0 | 58 |
| 2.5 | 45 |
| 5 | 44 |
| 10 | 44 |

Effectiveness at High Hardness

As earlier stated, the polymeric materials of the present invention possess a high and most desirable tolerance to hardness-imparting cations. In order to establish this feature of the polymers, a number of tests were conducted. The first of which tested the compatibility of the copolymer of Example 9F (NaAMPS/disodium maleate) by adding and mixing portions of the polymer in solutions ranging respectively in $Ca^{++}$ concentrations from 20 to 5,000 parts per million. The pH of the aqueous mediums containing the calcium ions were varied, i.e., pH of 6.5 and 8.5 to test the copolymer under both acidic and alkaline conditions. The results

TABLE 3

Conditions: Dispersion of 100 ppm $Fe_2O_3$ Suspensions
Water Conditions: pH 7–8
450 ppm $Ca^{+2}$
Suspensions allowed to stand 30 minutes before reading

| Polymer Dosage | Example 8A AMPS-Methacrylic acid (sodium salts) | Example 1 AMPS | Example 6A AMPS-N-methylol acrylamide | Example 11A AMPS-VP | Example 4B AMPS-AM | Example 9G |
| --- | --- | --- | --- | --- | --- | --- |
| 0 | 40 | 45 | 49 | 51 | 60.5 | 53 |
| 2.5 | 37 | 39.5 | 38.5 | 39 | 48.5 | 41.5 |
| 5 | 37 | 39 | 36 | 37 | 46 | 39.5 |
| 10 | 35 | 37.5 | 37 | 38.5 | 40 | 37 |

From the foregoing data, it is apparent that the AMPS polymer and copolymers were quite effective in suspending the iron oxide particles.

TABLE 4A

Conditions: Dispersion of 100 ppm $Fe_2O_3$ Suspensions
Water Conditions: pH 7–8
450 ppm $Ca^{+2}$
Suspensions allowed to stand 30 minutes before reading

| Polymer Dosage | Example 5D AMPS-MAM | Example 5C AMPS-MAM | Example 5B AMPS-MAM |
| --- | --- | --- | --- |
| 0 | 50 | 48.5 | 48 |
| 2.5 | 47 | 46 | 38.5 |
| 5 | 47.5 | 43 | 38.5 |
| 10 | 48 | 44 | 35 |

The results tabulated in Table 4A established quite conclusively that the copolymers of AMPS and methacrylamide were effective when the concentrations of the respective monomers were varied in the polymerization thereof.

of the respective tests were similar in that no visible turbidity was observed during mixing of the components and no sediment was observed after overnight storage of the solutions. The polymer, therefore, was compatible with $Ca^{++}$ over the specified range.

In order to establish whether the dispersant characteristics of the subject polymers were affected by drastic changes in hardness content of the water, several of the polymers produced were tested for their efficiency in dispersing ferric oxide at diverse conditions. The method utilized was that as utilized to obtain the data as set forth in Table 3. The results of the test as recorded in Tables 5A and 5B clearly established that the polymers of the invention were effective as dispersants for iron oxide over a wide range of calcium ion concentrations.

TABLE 5A

Conditions: 1000 ppm $Fe_2O_3$
Treatment - 10 ppm of polymer
Concentration of $Ca^{++}$ - 800 ppm
pH - 7.0

| Polymer | Percentage Transmission |
| --- | --- |
| None | 56.5 |
| Example 4A | 50.1 |
| Example 5B | 44.4 |
| Example 6A | 48.4 |

TABLE 5B

Conditions: 1000 ppm $Fe_2O_3$
Treatment - 10 ppm of polymer
pH - 7.0
Concentration of $Ca^{++}$ - 800 ppm

| $Ca^{++}$ Content | Treatment Level-ppm | Polymer of Example 5B | Example 9F | Example 4G | Example 5E |
| --- | --- | --- | --- | --- | --- |
| 800 | None | 55.3 | 65.8 | 65.8 | 65.8 |
|  | 1 | 44.0 | 54.7 | 58.8 | 59.8 |
|  | 2 | 41.6 |  |  |  |
|  | 2.5 |  | 49.8 | 53.2 | 55.3 |
|  | 5 | 39.0 | 37.4 | 52.5 | 52.3 |
|  | 10 |  | 37.4 | 49.6 | 49.3 |
| 100 | None | 56.7 |  |  |  |
|  | 1 | 37.8 |  |  |  |
|  | 2 | 35.1 |  |  |  |
|  | 5 | 30.8 |  |  |  |
| 80 | None |  | 65.8 | 65.8 | 65.8 |
|  | 1 |  | 57.7 | 62.0 | 62.0 |
|  | 2.5 |  | 42.7 | 50.6 | 54.0 |
|  | 5 |  | 27.6 | 48.2 | 49.4 |
|  | 10 |  | 24.7 | 42.9 | 47.8 |

Deflocculation

The polymers of the present invention not only possess the capacity to disperse iron oxide, but also have the capacity to counteract flocculation of iron oxide by other polymers which under the specific conditions recorded produce this effect. This capacity is indicated by the data recorded in Tables 6A and 6B which follow.

A suspension was prepared by adding 1000 ppm of $Fe_2O_3$ to water. It was noted that flocculation of the $Fe_2O_3$ particles quickly occurred. The transmission value for the medium was then taken after which various dosage levels of the copolymers were added to aliquot portions of the medium. The mediums were then gyratorily shaken for one-half hour, after which the transmission values for each were taken. As with the preceding tests, a lower percentage transmission value illustrates deflocculation and dispersion. The test results recorded below clearly established the capacity of the instant copolymers to function in their capacity.

TABLE 6A

Conditions of aqueous system: Concentration of $Ca^{++}$ - 80 ppm
pH - 7.3

| Polymer of | Dosage (ppm) | % Transmission |
| --- | --- | --- |
| None | — | 39.5 |
| Example 9F | 17.5 | 11.2 |
| Example 7A | 10 | 20.5 |
| Example 10A | 10 | 18.5 |

Additional tests utilizing different copolymers of the invention were performed using altered conditions of the aqueous medium. Under the conditions of the tests the copolymers were effective not only as dispersants for iron oxide, but also were quite effective in counteracting to a certain degree the flocculating effect that certain polymers currently used as dispersants yielded at the conditions of the test.

TABLE 6B

Conditions: 1000 ppm $Fe_2O_3$
Concentration of $Ca^{++}$ - 800 ppm
pH - 7 - aqueous solution
Treatment level - 10 ppm

| Polymer of | % Transmission | Remarks |
| --- | --- | --- |
| None | 56.5 |  |
| Example 6A | 48.4 | Dispersed |
| Example 4A | 50.1 | Dispersed |
| Example 5A | 44.4 | Dispersed |
| Copolymer of acrylamide-acrylic acid (M. W. 8,000) | 61.4 | Flocculated |
| *Polyacrylic acid (M. W. 100,000) | 73.0 | Severely flocculated |
| Example 5A/polyacrylic acid*(1:1) | 64.0 | Mildly flocculated |
| Example 9G/polyacrylic acid*(1:1) | 54.0 | Mildly flocculated |

Effect of pH

Several tests were conducted to ascertain the effect, if any, of pH upon the ability of the polymers to disperse iron oxide. The data recorded in the following Tables illustrates rather conclusively that the polymers are in fact operable for the purpose over a wide pH range. This is an important feature since most boiler water operations are conducted at high pH and low hardness, while in current trends the cooling water operations in large systems are conducted at low alkaline conditions with high hardness. Many systems (cooling water), however, are still being run under acid conditions. Accordingly, it is important that the dispersant be effective at all pH ranges.

TABLE 7A

Dispersion at high pH

Conditions of aqueous system: 200 ppm $Fe_2O_3$
Concentration of $Ca^{++}$ - 5 ppm
pH - 11

| Polymer of | Dosage | % Transmission |
|---|---|---|
| None (Mild Agitation) | 0 | 51 |
| Example 12B (terpolymer) | 1 | 32 |
| Example 12B (terpolymer) | 2.5 | 26 |
| Example 12B (terpolymer) | 5 | 27 |
| None (Severe Agitation) | 0 | 26.5 |
| Example 9G | 1 | 10.0 |
| Example 9G | 2.5 | 8.5 |
| Example 9G | 5 | 8.0 |

TABLE 7B

Dispersion at alkaline pH,
lower than 11 with higher hardness ($Ca^{++}$) levels
Conditions: 1000 ppm $Fe_2O_3$
Concentration of $Ca^{++}$ - 80 ppm
Dosage level - 10 ppm

| Treatment | pH | % Transmission |
|---|---|---|
| None | 8 | 68 |
| Example 4G | 8 | 60 |
| None | 10 | 70 |
| Example 4G | 10 | 62 |

Dispersion of $Fe_2O_3$ at Acid Conditions

At the experimental conditions evaluated in this instance, i.e., pH 4.5, the $Fe_2O_3$ control is deflocculated. The percent transmission values in the following Table 7C indicate that the treatments did to some extent result in deflocculation over the control. After 24 hours settling, there are no significant differences between the control and treatments with all samples being very disperse. The suspensions were then titrated with $Na_2SO_4$, which represents an increase in ionic strength and is closer to real conditions of ionic strength due to hardness and treatment contributions as they might exist in actual systems. The results show that the control coagulated completely after the addition of 0.6 ml of 1M $Na_2SO_4$ to 100 cc of $Fe_2O_3$ suspension. This corresponds to a $SO_4^=$ concentration of 575 ppm. The suspensions treated with the AMPS copolymers did not coagulate at $SO_4^=$ concentrations as high as 5750 ppm indicating adsorption of the polymers and strong activity as "protective colloids."

These polymers, therefore, will be effective dispersants for $Fe_2O_3$ in low pH systems. Their effectiveness should reduce the corrosion load in acidic systems by dispersing the iron oxide forming at corroding surfaces and thereby reduce or eliminate the $Fe/Fe_2O_3$ couple which contributes to corrosion.

TABLE 7C

Conditions of aqueous system: 1000 ppm $Fe_2O_3$
Concentration of $Ca^{++}$ - 80 ppm
Treatment level - 10 ppm
pH - 4.5 (average)

| Polymer of | %T (30 ppm $Fe_2O_3$ dilution) | Ml of 1M $Na_2SO_4$ to Coagulate Suspension |
|---|---|---|
| None | 14.6 | 0.6 |
| Example 4G(AMPS/AM-70/30) | 13.9 | >>6 |
| Example 9G(AMPS/diNaMaleate-62/38) | 11.8 | >26 |
| Example 7A(AMPS/NaAcrylate-70/30) | 13.6 | >>6 |
| Example 10B(AMPS/NaItaconate-70/30) | 12.2 | >>6 |

In order to substantiate the claim that the polymers of the invention are capable of dispersing iron oxide ($Fe_2O_3$) over a wide pH range, an additional study was conducted utilizing acid, neutral and alkaline environments. The procedure utilized simply required the addition of 1000 ppm of $Fe_2O_3$ to water with acid or base adjustment to attain the test pH. The mediums were shaken for one-half hour to equilibrate and a final pH adjustment was made. Polymers were then added to the appropriate samples of the medium and a transmission value was determined on 3% dilutions on both the blanks and the treated samples after an additional half-hour of shaking. In the values recorded, a high percentage of transmission indicates flocculation while a low percentage transmission value indicates dispersion of flocculated particles. Also included in the Table is the data determined for certain commercially available dispersants currently used in the field.

TABLE 7D

Concentration of $Ca^{++}$ - 80 ppm

| Polymer of | Dosage ppm | pH | %T | pH | %T | pH | %T |
|---|---|---|---|---|---|---|---|
| None | | 4.3 | 14.6 | 7.1 | 51.2 | 8.8 | 54.8 |
| Example 4G | 10 | 4.3 | 13.9 | 7.3 | 30.9 | 8.8 | 40.0 |
| Example 9A | 17.5 | 4.7 | 11.8 | 7.3 | 21.2 | 8.6 | 28.2 |
| Example 7A | 10 | 4.5 | 13.6 | 7.3 | 27.7 | 8.6 | 34.1 |
| Example 10A | 10 | 4.5 | 12.2 | 7.3 | 26.9 | 8.4 | 24.6 |
| Acrylate Polymer (M. W. 1000) | 10 | 4.4 | 40.4 | 7.3 | 46.2 | 9.0 | 47.8 |
| Copolymer Acrylic acid/ acrylamide (M. W. 8000) | 10 | 4.3 | 42.3 | 7.4 | 49.1 | 9.0 | 54.4 |

The above data establishes that although the copolymers were effective at all of the Ph levels tested, they are most effective at neutral.

Dispersion of Clay

In order to establish the effectiveness of the present polymers in their dispersing capacity with regard to clays, suspension systems containing Hydrite UF, a standard type clay, were prepared and several species of the instant polymers were tested at various conditions. The following describes the tests conducted and the conditions under which they were performed. Measurement of dispersive properties was accomplished in the manner set forth in the description for Table 1. The actual equipment utilized, as in all of the preceding tests, was a simple photometer.

TABLE 8A

| Conditions of the aqueous system: | 1000 ppm of clay<br>Concentration of $Ca^{++}$ - 800 ppm<br>pH - 7<br>Dosage level - 10 ppm |
|---|---|

| Polymer of | % Transmission |
|---|---|
| None | 39.0 |
| Example 6A | 36.3 |
| Example 4A | 36.1 |
| Example 5B 445-75A(AMPS-MAM) | 35.4 |
| Acrylamide-acrylic acid copolymer (M. W. 8,000) | 38.0 |
| CMC (carboxymethylcellulose) | 39.0 |

This comparison established that the AMPS copolymers dispersed clay even under very high hardness conditions. In comparison, the acrylic acid-acrylamide copolymer (considered a very good dispersant) caused mild dispersion under these conditions, while CMC has little effect.

An additional test was conducted utilizing the polymers as set forth in Table 8A. This test was performed to establish the effectiveness of the polymers at lower calcium, i.e., 80 ppm $Ca^{++}$ ion values, and higher polymer dosage rates, i.e., 100 ppm. Otherwise, the conditions were the same as those recited for Table 8A. Also tested were polymer materials generally felt to be quality dispersants for clays.

TABLE 8B

| Polymer of | % Transmission at 80 ppm $Ca^{++}$ |
|---|---|
| None | 52.1 |
| Example 6A | 43.7 |
| Example 4A | 46.2 |
| Example 5B | 44.9 |
| Copolymer of acrylamide-acrylic acid (M. W. 8,000) | 57.0 |
| CMC (carboxymethylcellulose) | 54.0 |

Under these overdosed conditions (100 ppm polymer), it was noted that the AMPS polymers disperse; whereas, the commercial copolymer and CMC flocculated the suspension.

Since somewhat better treatment effectiveness and sensitivity was observed at lower $Ca^{++}$ levels in $Fe_2O_3$ suspensions, similar conditions were investigated for clay suspensions.

Aqueous clay (Hydrite UF) suspensions were prepared at 1000 ppm suspended solids and treated with the polymer of Example 9F over a dosage range from 1 to 25 ppm. After 30 minutes' shaking, aliquots of the suspensions were analyzed using the Betz Photometer. In this instance, since clay will settle rather rapidly and accordingly give a low reading, an increasing scale reading means dispersion. The results are summarized in Table 8C.

The visual observations indicated all samples were more disperse than the control. After 1 hour settling, the controls were almost completely settled while the treatments showed hardly any settling. After overnight standing, all the 800 ppm $Ca^{++}$ samples were settled. At 80 ppm $Ca^{++}$, only the control and 1 ppm Example 9F polymer were settled. The 2.5 and 5 ppm levels showed some settling while the 10 and 25 ppm levels showed hardly any. These observations indicate a very

TABLE 8C

| | Photometric Analysis of Clay Suspensions | | | |
|---|---|---|---|---|
| Polymer of | ppm level | pH | 80 ppm $Ca^{++}$ scale reading | 800 ppm $Ca^{++}$ scale reading |
| None | | 6.1 | 62 | 65 |
| Example 9F AMPS/disodium maleate copolymer | 1 | 6.3 | 64 | 68 |
| | 2.5 | 6.3 | 64 | 68 |
| | 5 | 6.3 | 66 | 70 |
| | 10 | 6.5 | 67 | 68 |
| | 25 | 6.6 | 68 | 68 | significant suspending effect for the polymer of Example 9F on clay suspensions. The magnitude of the treatment effect is not indicated by the instantaneous %T measurement on clay systems as it is on $Fe_2O_3$ suspensions.

Therefore, a series of measurements were made on clay suspensions comparing various treatments. The top 50 cc aliquots of the suspension were analyzed spectrophotometrically immediately and after a 24-hour standing interval. The results at three pH levels are summarized in Table 8D. Transmission values for

TABLE 8D

| | Summary of Measurements, Clay, 80 ppm $Ca^{++}$ | | | | | | | | |
|---|---|---|---|---|---|---|---|---|---|
| | Treatment | | Transmission Reading | | | Transmission Reading | | | Transmission Reading |
| Polymer of | ppm | pH | $T_1$ | $T_{24}$ | pH | $T_1$ | $T_{24}$ | pH | $T_1$ | $T_{24}$ |
| None | | 4.6 | 43.0 | 88.9 | 7.6 | 45.5 | 88.8 | 8.9 | 38.0 | 87.6 |
| Example 4G | 10 | 4.6 | 37.2 | 12.6 | 7.7 | 41.3 | 74.8 | 8.9 | 35.4 | 72.0 |
| Example 7A | 10 | 4.9 | 40.0 | 4.5 | 7.7 | 41.6 | 2.1 | 8.8 | 34.8 | 0 |

TABLE 8D — Continued

Summary of Measurements, Clay, 80 ppm $Ca^{++}$

| Polymer of | Treatment ppm | pH | Transmission Reading $T_1$ | $T_{24}$ | pH | Transmission Reading $T_1$ | $T_{24}$ | pH | Transmission Reading $T_1$ | $T_{24}$ |
| --- | --- | --- | --- | --- | --- | --- | --- | --- | --- | --- |
| Example 9F | 17.5 | 5.3 | 37.6 | 4.0 | 7.8 | 38.9 | 20.6 | 8.9 | 34.7 | 10.6 |
| Example 10B | 10 | 4.7 | 37.8 | 9.8 | 7.7 | 39.3 | 3.2 | 8.6 | 34.4 | 0 |
| Polyacrylic acid (M. W. 1000) | 10 | 5.2 | 39.2 | 41.0 | 7.7 | 40.8 | 54.0 | 8.7 | 35.8 | 34.8 |
| Hydrolyzed polyacrylamide (M. W. 8000) | 10 | 5.2 | 42.5 | 15.7 | 7.8 | 46.7 | 66.0 | 8.7 | 38.8 | 52.6 |

*Low reading indicates dispersion the 24-hour samples were taken on undiluted suspensions; those for the initial values were taken on 3% dilutions.

This summary clearly shows that the polymer of Example 9F is the most effective clay treatment in the series over the entire pH range and on an overall basis. The AMPS/diNaMaleate polymer was much more effective than the polyacrylic acid polymer which is considered to be quite good as a dispersant of clay.

Calcium Carbonate Dispersion

A similar series of meaasurements were made on $CaCO_3$ suspensions in 80 ppm $Ca^{++}$ water at pH - 8.3. The visual observations after 3 hours' settling indicated that the control settled while Example 9F and Example 4G showed no settling. After overnight settling, the following results were obtained:

TABLE 9A

| Polymer of | Dosage (ppm) | pH | Photometer Reading |
| --- | --- | --- | --- |
| None |  | 8.3 | 6 |
| Example 4G | 10 | 8.3 | 26 |
| Example 9F | 10 | 8.3 | 40 |

This summary shows the significant suspending effect of the AMPS copolymer treatments on $CaCO_3$. In this instance, the larger the reading the greater the dispersion, again because of the tendency of calcium carbonate particles to settle.

For the most part, calcium carbonate particles are fairly difficult to disperse and any treatment which can suspend these particles even to a minor degree is considered to be effective for the purpose. A few examples of the polymeric materials which can act in this capacity are set forth in Table 9B which follows:

TABLE 9B

| Conditions of the aqueous system: | 1000 ppm calcium carbonate Concentration of $Ca^{++}$ - 800 ppm pH - 7.5 Dosage - 10 ppm copolymer |
| --- | --- |
| Polymer of | % Transmission |
| None | 46.0 |
| Example 5A | 44.0 |
| Example 6A | 45.2 |
| Copolymer of acrylic acid-acrylamide (M. W. 10,000) | 51.6 |

The instant copolymers faired under the conditions of this test much better than the commercial copolymer. This is significant since the test conditions, namely the high hardness, were considered to be extreme. It was felt that any showing of effectiveness under these conditions would clearly establish the value of the copolymers.

Calcium Phosphate Dispersion

A common problem which is found in boiler water operations is the formation and deposition of calcium phosphate. As with calcium carbonate, calcium phosphate is also difficult to disperse and accordingly any polymer which is capable of suspending and dispersing this compound even to a small extent is desirable. In this regard, three copolymers of AMPS were tested under the following conditions, the results of which are tabulated in Table 10:

TABLE 10

| Conditions of aqueous system: | 1000 ppm of calcium hydroxyapatite Concentration of $Ca^{++}$ - 800 ppm Dosage rate of polymer - 10 ppm |
| --- | --- |
| Polymer of | % Transmission |
| None | 55.0 |
| Example 4A | 54.6 |
| Example 5A | 53.7 |
| Example 6A | 54.5 |

The instant polymers were considered effective for the purpose in view of the drastic nature of the conditions of the test. The high hardness content is considered to be quite a stringent condition and the fact that the polymers showed utility and operability under these circumstances is felt to be indicative of the high value of the instant polymers.

Dispersion of Salts

In order to establish the effectiveness of several of the present copolymers as dispersants for calcium oxalate and undesirable precipitates commonly found in the aqueous systems of paper and pulp mill systems, calcium carbonate and aluminum silicate transmission data was collected utilizing the procedure which follows.

The respective salt tested was precipitated from a solution at 10 times supersaturation. The solution bearing the suspended matter was then treated with 10 ppm of the particular polymer and allowed to stand at a temperature of 25°C. The pH of the aqueous medium was 8.5.

The results of the tests are contained in Table 11 which follows. A lower percentage transmission value indicated good dispersion.

TABLE 11

| Polymer of | Percentage Transmission | | |
|---|---|---|---|
| | Calcium carbonate | Calcium oxalate | Aluminum silicate |
| Control | 8.6 | 57.7 | 39.6 |
| Example 4G | 6.3 | 33.5 | 36.1 |
| Example 4L | 3.6 | 44.8 | 38.2 |

Influence of the AMPS Copolymers on the Rheological Properties of High Solids Content Silt-Mud The data recorded in the following Table demonstrates the effect of several of the subject polymers on the rheological behavior of a silt-mud slurry.

A sample of earth (alluvial) was washed repeatedly to remove both the finest colloid fraction and the coarsest mineral fraction. The remaining fraction was then centrifuged and the resulting paste adjusted with water to a 60% solids content.

Portions of the slurry were treated with 62.5, 125 and 250 ppm polymer and the viscosity measured. A Brookfield viscometer over a range up to 60 rpm was utilized. The rpm's versus Brookfield readings were recorded. Higher Brookfield readings in these instances indicate a higher viscosity. To be effective for the purpose of this test, the polymer must be capable of producing a fluid medium and maintaining a constant viscosity thereof until the medium is treated as desired. In each of the tests performed, a No. 3 spindle was utilized to make the measurements.

TABLE 12A

Polymer feed rate - 62.5 ppm

| Polymer of | RPM | Readings |
|---|---|---|
| None | 1.5 | 13.5 |
| Example 10B | 1.5 | 8.6 |
| Example 9A | 1.5 | 8.1 |
| None | 3.0 | 15.0 |
| Example 10B | 3.0 | 15.5 |
| Example 9A | 3.0 | 14.4 |
| None | 6.0 | 26.0 |
| Example 10B | 6.0 | 27.3 |
| Example 9A | 6.0 | 26.7 |
| None | 12.0 | 49.0 |
| Example 10B | 12.0 | 38.3 |
| Example 9A | 12.0 | 42.0 |
| None | 30.0 | 59.5 |
| Example 10B | 30.0 | 44.6 |
| Example 9A | 30.0 | 48.8 |
| None | 60.0 | 64.0 |
| Example 10B | 60.0 | 48.1 |
| Example 9A | 60.0 | 50.8 |
| Polymer Feed Rate - 250 ppm | | |
| None | 1.5 | 13.5 |
| Example 10B | 1.5 | 10.3 |
| Example 9A | 1.5 | 9.1 |
| Commercial polymer* | 1.5 | 12.5 |
| None | 3.0 | 15.0 |
| Example 10B | 3.0 | 12.6 |
| Example 9A | 3.0 | 12.7 |
| Commercial polymer* | 3.0 | 14.0 |
| None | 6.0 | 26.0 |
| Example 10B | 6.0 | 15.3 |
| Example 9A | 6.0 | 15.4 |
| Commercial copolymer* | 6.0 | 18.9 |
| None | 12.5 | 49.0 |
| Example 10B | 12.5 | 16.8 |
| Example 9A | 12.5 | 18.0 |
| Commercial copolymer* | 12.5 | 31.0 |
| None | 30.0 | 59.5 |
| Example 10B | 30.0 | 18.4 |
| Example 9A | 30.0 | 19.6 |
| Commercial copolymer* | 30.0 | 46.5 |
| None | 60.0 | 64.0 |

TABLE 12A-Continued

Polymer feed rate - 62.5 ppm

| Polymer of | RPM | Readings |
|---|---|---|
| Example 10B | 60.0 | 20.9 |
| Example 9A | 60.0 | 21.5 |
| Commercial copolymer* | 60.0 | 49.0 |

A subsequent series of tests were conducted in order to establish the effect on viscosity with an increase in treatment level. In these tests, the "rpm" was maintained constant.

TABLE 12B

| RPM = 12 | | |
|---|---|---|
| Polymer of | Treatment Level (ppm) | Readings |
| None | — | 49.0 |
| Example 10B | 62.5 | 38.3 |
| Example 9A | 62.5 | 42.0 |
| Commercial copolymer* | 62.5 | 39.5 |
| None | — | 49.0 |
| Example 10B | 125 | 29.6 |
| Example 9A | 125 | 32.5 |
| Commercial copolymer* | 125 | 45.5 |
| None | — | 49.0 |
| Example 10B | 250 | 16.8 |
| Example 9A | 250 | 18.0 |
| Commercial copolymer* | 250 | 31.0 |
| RPM = 60 | | |
| None | — | 64.0 |
| Example 10B | 62.5 | 48.1 |
| Example 9A | 62.5 | 50.8 |
| Commercial copolymer* | 62.5 | 68.1 |
| None | — | 64.0 |
| Example 10B | 125 | 36.2 |
| Example 9A | 125 | 39.6 |
| Commercial copolymer* | 125 | 67.9 |
| None | — | 64.0 |
| Example 10B | 250 | 20.9 |
| Example 9A | 250 | 21.5 |
| Commercial copolymer* | 250 | 49.0 |

*Commercial copolymer - acrylamide/acrylic acid copolymer - Molecular Weight approximately 8,000

As the data recorded in Table 12 establishes, the use of the Example 10B and 9A polymers results in almost Newtonian behavior at the higher dosages, while the Commercial copolymer, an established dispersant, retains non-Newtonian behavior even at 250 ppm. At the lower dosage, all the polymers raise the yield points, i.e., the polymers allow the slurry to retain low, quasi-Newtonian behavior to higher shear rates (increase in rpm).

The data recorded in Table 12B shows the influence of the polymer dosage at constant shear. The viscosity reduction is quite substantial in the case of the Polymers of Examples 10B and 9A, while the influence of the Commercial copolymer is quite small. The data determined at the higher shear rate (60 rpm) amplifies the results obtained using the lower shear rate.

The data quite clearly establishes that the polymers of the instant invention are particularly effective in fluidizing slurries of this type to improve rate of flow, pumpability, molding properties and uniformity. The polymers therefore could be used to prevent sludge buildup in vessels, storage tanks, bilge tanks, cooling tower sumps, etc., and accordingly to make a variety of solids more easily pumpable as in rinsing applications and sludge removal.

To establish the effectiveness of the subject polymers as dispersants for mud/silt, a test was devised to show that the polymers were capable of inhibiting flocculation of such by high molecular weight coagulants.

A slurry of mud/silt was prepared by washing a sample of earth (alluvi free of small particle size colloidal fractions and large mineral fractions. The remaining fraction was centrifuged and adjusted to produce a 6% solids content. To samples of the slurry were then added 25 ppm of the respective inventive polymers listed in Table 12C. 100 cc of the respective samples were then placed in a graduated cylinder and dosed with a high molecular weight (approximately 10,000,000) copolymer of acrylamide and acrylate. The flocculated particles were allowed to settle completely and a settled volume was read prior to compaction taking place.

TABLE 12C

| Polymer of | Settled Volume |
| --- | --- |
| None | 23 |
| Example 9A | 15 |
| Example 4G | 14 |
| Example 10B | 12 |
| Commercial copolymer* | 17 |

The data demonstrates quite clearly that the instant polymers were capable of fluidizing the particles and inhibiting the settling effect which would normally be expected. In addition, the polymers were more effective than a Commercial copolymer which is generally used for this purpose.

Corrosion Inhibition, Rust Removal and Tubercle Removal Properties of AMPS Polymers Since the polymers of the invention were excellent dispersants of iron oxide, it appeared that they might also possess utility in not only removing rust deposits and tubercles appearing on corroded metallic surfaces, but also might serve to reduce the corrosion taking place upon the metallic surfaces. In order to establish the properties of the polymers, certain tests were performed, the description for which and the data calculated are recorded in the following sections.

Corrosion Inhibition and Rust Removal

An aqueous system was prepared which closely assimilated the water system normally found being utilized in cooling water systems, which for test purposes is normally referred to as Standard Cooling Water. The pH of the aqueous system was approximately 6.5 and the temperature approximately 25°C.

To samples of the medium was added a Commercial Treatment containing 300 ppm of $CrO_4^=$ and 3 ppm of $Zn^{++}$. To one sample was added 10 ppm of the copolymer of Example 4G and to another sample was added 10 ppm of the copolymer of Example 9F. In each of the samples was suspended a number of iron (mild steel) coupons which had been precorroded to a 1.1% weight loss. The mediums were stirred gently over a period of seven (7) days. The medium containing no polymer was of course utilized as the control and the usage of the treatment insured as effectively as possible an equal corrosion load.

By consideration of the original weight of the coupons, the dry weight of the coupons and the weights of the coupons after drying and cleaning, it was ascertained that the addition of the polymer of the invention not only was effective for removing and dispersing the rust on the surface of the coupons, but also was effective in decreasing the rate of corrosion. The data supporting these results are recorded in the following Table.

TABLE 13A

| Treatment | % Rust Removed by Polymer (average) | % Coupon Weight Loss (Corrosion) |
| --- | --- | --- |
| Commercial Treatment | Used as Standard | 2.04 |
| Commercial Treatment | — | 2.04 |
| Commercial Treatment plus Polymer of Example 4G | 6.4 | 1.76 |
| " | — | 1.81 |
| Commercial Treatment plus Polymer of Example 9F | 6.4 | 1.74 |
| " | — | 1.54 |

Tubercle Removal

In order to test the effectiveness of the instant polymers in removing tubercles formed by localized corrosion and pitting, samples of standard cooling water containing 15 ppm of sodium bichromate, 4 ppm of $Na_3PO_4 \cdot 12H_2O$ and 1000 ppm of sodium chloride were prepared. To one sample was added 10 ppm of the polymer of Example 7A and to another was added 10 ppm of the polymer of Example 10B. Previous testing had shown that the chromate-phosphate-chloride mixture was particularly adept not only at providing a constant corrosion load, but also at developing tubercle growth on high carbon steel coupons. The pH of the samples was adjusted to between 6.5 and 7.

After 5 days, the corrosion rate of the various systems was determined by determining the average weight loss of the respective coupons. In addition, after 5 days, a visual tubercle count was made including tubercles larger than 1 mm in diameter. The results were as follows:

TABLE 13B

| Treatment | Corrosion Rate (Mils per year) | Number of Tubercles |
| --- | --- | --- |
| None | 3 | 45 |
| Polymer of Example 7A | 3 | 0 |
| Polymer of Example 10B | 4 | 5 |

The above data illustrates that although the corrosion loads for the respective systems were fairly constant, the coupons contained in the mediums containing the polymers of the invention were much better from the standpoint of tubercles. Accordingly, the conclusion drawn from the data is that the polymers were quite effective in controlling tubercle growth and/or removing tubercles from the surface of the coupon.

The polymeric materials of the invention then cannot only be used to remove rust accumulations and to inhibit corrosion of metallic surfaces, but also can be utilized to inhibit tubercle formation and to remove existing tubercles. Although the tests were conducted at a treatment rate of 10 ppm, the treatment range would be from about 0.1 to about 100 ppm and preferably from about 5 to about 50 ppm for each of the respective purposes. To remove tubercles already formed, for example, on the inner surface of a metallic pipe, the polymers need only be added to the aqueous medium circulating or flowing through the metal structure. The polymers of the invention may be fed on a continuous basis to remove existing tubercles and to insure that new tubercles do not form, or may be fed intermittently for a time sufficient to remove the existing tubercles. Depending upon the severity of the problem, the treatment may necessarily have to be fed for a time ranging from one week to one year if all that is intended is the removal of the existing tubercles. For the dispersion and removal of rust and for corrosion inhibition, the feed should be programmed to be on a continuous or semi-continuous basis for the period that the piping or conveyance structure is on stream.

In view of the foregoing then, it is evident that the polymeric materials of the instant invention have widespread utility.

Having thus described the invention, what we claim is:

1. A method of inhibiting the corrosion of a metal surface in contact with an aqueous solution which comprises adding to said solution from about 0.1 to about 100 parts per million parts of said solution of a water-soluble polymer of a sulfonic acid compound having the formula:

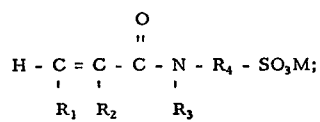

wherein $R_1$, $R_2$ and $R_3$ are selected from the group consisting of hydrogen, lower alkyl, $R_4$ is an alkylene or an alkyl substituted lower alkylene and M is hydrogen, alkali metal cation and ammonium.

2. A method according to claim 1 wherein the polymer is a copolymer of said sulfonic acid compound and at least one other vinylic monomer selected from the group consisting of acrylic acid, the alkali metal and ammonium salts of acrylic acid, esters of acrylic acid, methacrylic acid, the alkali metal and ammonium salts of methacrylic acid, esters of methacrylic acid, acrylamide, the alkyl substituted acrylamides, the N-alkanol substituted acrylamides, vinyl pyrrolidone, maleic acid or anhydride, the alkali metal and ammonium salts of maleic acid, itaconic acid, the alkali metal and ammonium salts of itaconic acid, esters of maleic acid, esters of itaconic acid, said polymer has a molecular weight of from about 1,000 to 100,000 and contains from about 20 to about 80% by weight of said sulfonic acid compound and from about 80 to about 20% of said vinylic monomer.

3. A method according to claim 2 wherein the sulfonic acid compound is 2-acrylamido-2-methylpropane sulfonic acid or a water-soluble salt thereof.

* * * * *